US008899545B2

(12) United States Patent
Blees et al.

(10) Patent No.: US 8,899,545 B2
(45) Date of Patent: Dec. 2, 2014

(54) APPARATUS FOR AFFIXING AN OBJECT TO A RAIL

(75) Inventors: Christoph Blees, Hamburg (DE); Dieter Krause, Buchholz (DE); Ralf Koblitz, Hamburg (DE); Oliver Gehlen, Quickborn (DE); Dirk Humfeldt, Hamburg (DE); Mark Herzog, Barsbuettel (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/163,535

(22) Filed: Jun. 17, 2011

(65) Prior Publication Data

US 2011/0309214 A1    Dec. 22, 2011

Related U.S. Application Data

(63) Continuation of application No. PCT/EP2009/066529, filed on Dec. 7, 2009.

(60) Provisional application No. 61/138,233, filed on Dec. 17, 2008.

(30) Foreign Application Priority Data

Dec. 17, 2008    (DE) .......................... 10 2008 062 466

(51) Int. Cl.
*A47B 97/00*    (2006.01)
*B65D 63/00*    (2006.01)
*B64D 9/00*    (2006.01)
*B64C 1/20*    (2006.01)

(52) U.S. Cl.
CPC .... *B64C 1/20* (2013.01); *B64D 9/00* (2013.01)
USPC ........ 248/503; 248/503.1; 248/424; 248/419; 248/429; 410/101; 410/104; 410/105; 410/77; 410/80; 410/81; 244/118.1; 244/118.6; 297/463.1

(58) Field of Classification Search
USPC ...................... 248/503, 503.1, 424, 419, 429; 410/101, 104, 105, 77, 80, 81; 244/118.1, 118.6; 297/463.1
See application file for complete search history.

(56) References Cited

U.S. PATENT DOCUMENTS 3,480,240 A    3/1968  Giudice
4,213,593 A *  7/1980  Weik ............................ 248/501
(Continued)

FOREIGN PATENT DOCUMENTS

DE    1912881 A1    11/1969
DE    2556000 C2     2/1983
(Continued)

OTHER PUBLICATIONS

International Search Report, dated Nov. 24, 2010, for International Application No. PCT/EP 2009/066529.

(Continued)

*Primary Examiner* — Christopher Garft
(74) *Attorney, Agent, or Firm* — Ingrassia Fisher & Lorenz, P.C.

(57) ABSTRACT

An apparatus for affixing an object to a rail includes, but is not limited to at least one base body, at least one locking body and at least one operating element. The locking body is held so as to be movable relative to the base body and is connected to the operating element by way of at least one bearing. The operating element is arranged so as to be rotatable in the base body, includes, but is not limited to a cam that acts on the base body, and when rotated moves the locking body towards the base body. In this way apparatus is created which makes possible the manual affixing and undoing, without the need for tools, of an object on and from a rail, for example, if needed, in order to reposition displaceable monuments in a cabin of an aircraft.

7 Claims, 4 Drawing Sheets

(56) References Cited

U.S. PATENT DOCUMENTS

| | | | |
|---|---|---|---|
| 4,449,875 A * | 5/1984 | Brunelle | 410/80 |
| 5,178,346 A * | 1/1993 | Beroth | 244/122 R |
| 5,427,349 A * | 6/1995 | Obrecht | 248/657 |
| 5,520,357 A * | 5/1996 | Payne et al. | 244/118.1 |
| 6,234,552 B1 * | 5/2001 | Kruger | 296/65.03 |
| 7,661,637 B2 * | 2/2010 | Mejuhas et al. | 248/157 |
| 2007/0063101 A1 * | 3/2007 | Tiid et al. | 244/118.5 |
| 2008/0149764 A1 * | 6/2008 | Frey | 244/118.5 |
| 2010/0001546 A1 * | 1/2010 | Christensen | 296/65.13 |
| 2010/0264269 A1 | 10/2010 | Stoob et al. | |

FOREIGN PATENT DOCUMENTS

| | | |
|---|---|---|
| DE | 4345006 A1 | 7/1995 |
| DE | 19851392 A1 | 5/1999 |
| DE | 102004012262 A1 | 9/2005 |
| DE | 202005010919 U1 | 9/2005 |
| DE | 102004047455 A1 | 4/2006 |
| DE | 102006021956 A1 | 1/2008 |
| EP | 0665160 A2 | 8/1995 |
| EP | 1596075 A1 | 11/2005 |
| EP | 1892142 A1 | 2/2008 |
| WO | 2009068331 A1 | 6/2009 |

OTHER PUBLICATIONS

German Office Action, dated Oct. 29, 2009 for German Application No. 10 2008 062 466.7.
International Preliminary Report on Patentability, dated Jun. 21, 2011, for International Application No. PCT/EP 2009/066529.
German Patent Office, Office Action for Application No. 10 2008 062 466.7 Mailed Jul. 1, 2013.

* cited by examiner

A-A:

B-B:

APPARATUS FOR AFFIXING AN OBJECT TO A RAIL

CROSS REFERENCE TO RELATED APPLICATIONS

This application is a continuation of International Application No. PCT/EP2009/066529, filed Dec. 7, 2009, which was published under PCT Article 21(2) and which claims priority to German Patent Application No. 102008062466.7 filed Dec. 17, 2008 and of U.S. Provisional Patent Application No. 61/138,233 filed Dec. 17, 2008, the disclosure of which applications is hereby incorporated herein by reference.

TECHNICAL FIELD

The invention relates to an apparatus for affixing an object to a rail, to the use of such an apparatus, and an aircraft comprising at least one object and at least one apparatus for affixing an object to a rail.

BACKGROUND

Below, aspects of the invention are described with reference to affixing objects in a cabin of a passenger aircraft. However, the concrete description of the invention is to be interpreted only as showing exemplary embodiments. The aspects of the invention can be transferred to other fields of use which in whatever manner make it necessary to affix objects to a rail, be it in a vehicle or in stationary premises.

One of the requirements of cabins in passenger aircraft, which requirement may in future assume increased importance, consists of the option of quickly reconfiguring the cabin layout during conventional aircraft operation. This makes it imperative for components to be able to be affixed flexibly at different locations in the cabin, wherein changing the position of, affixing and renewed undoing of respective objects should take place as quickly as possible. To this effect so-called seat rails are in widespread use which extend in the cabin floor within the cabin of the passenger aircraft, and which seat rails make it possible for cabin components to be installed on them. Any type of components can be arranged on the seat rails, not only passenger seats but also larger installations ("monuments"), for example kitchen ("galleys") or toilets. The components can preferably be displaced along the seat rails and can be affixed at other predetermined locations.

Such solutions for fastening monuments to seat rails are based on threaded inserts that are placed into a seat rail and at the desired position are screwed to the respective monument. In this arrangement, tolerance compensation in the floor plane takes place by means of a double cam, while tolerances in height can be compensated for by way of washers or shims or a threaded bush, as, for example, proposed in DE 102004012262 A1 or US 20070063101 A1.

A particular disadvantage associated with the known solutions for installing monuments within a cabin relates, in particular, to the fact that installation and deinstallation are very time consuming. Furthermore, loose individual components, which are therefore easy to lose, are used. Moreover, for affixing or undoing respective objects to or from a rail, installation without the use of tools is not possible. Furthermore, with known devices it is not possible to move monuments to a new position by displacing them in the seat rail, i.e. without lifting them out of the seat rail.

Accordingly, it can be considered to be an object of the invention to propose an apparatus for affixing an object to a rail, which apparatus at least lessens some of the above-mentioned disadvantages or eliminates them altogether. In particular, it could be an object of the invention to propose such apparatus in which installing and deinstalling an object on or from a rail is made possible without the use of tools. It could be considered to be a further object of the invention to create such apparatus by means of which the object to be installed can be displaced along the rail.

SUMMARY

This object could be met by apparatus for affixing an object on a rail, by the use of such apparatus, and by an aircraft.

A first aspect of the invention is the use of at least one locking body that comprises a shape which makes it possible for said locking body to be inserted into the respective rail, and for said locking body to be locked to the rail. For example, it would be possible to consider a seat rail in a floor of a passenger cabin of an aircraft, which seat rail usually comprises a central slit that extends in the direction of elongation, which slit comprises essentially circular apertures, regularly spaced apart from each other, usually spaced apart by one inch. The above-mentioned locking body can be shaped correspondingly to the aforesaid so that said locking body comprises, for example, an elongated body that can be inserted into the slit, and comprises several circular projections that correspond to the circular apertures in the seat rail. By moving the locking body within the rail, the projections can be placed underneath the spaces between the individual circular apertures, which are designed in the manner of lug-like projections, where in a so-called locking position they can, for example, establish a non-positive-fit or a positive-fit connection.

The locking body is preferably movably held to a base body so that it can move relative to the rail in such a manner that it can move into the rail or out of the rail. This makes it possible to either affix or undo the locking body, and thus also the base body on which the object to be locked is arranged. The base body is preferably designed in such a manner that it can rest against the top of the rail, and in that position can introduce into the rail the weight force weighing on it.

A further aspect of the invention is an apparatus according to the invention comprising an operating element by means of which without the use of tools and purely by manual action, affixing or undoing the object to or from the rail is made possible. This could be achieved by manual deflection of the locking body.

According to an advantageous improvement of the apparatus according to the invention, the bottom of the base body comprises a plane surface comprising at least one projection whose form corresponds to the central slit or to an otherwise arranged slit in the rail. This makes it possible for the apparatus both to introduce the weight force into the rail, and to slide along the rail, wherein the projection plunges into the slit of the rail, thus allowing guidance. It would be imaginable, for example, for an object to be arranged on several items of apparatus according to the invention in several adjacent or parallel seat rails in a cabin of an aircraft, wherein said object can be displaced along the rails within the cabin to a desired installation location. With such a design of the base body it could be ensured that even particularly large and heavy objects are displaced only along the direction of elongation of the rails, and that no other parts of the floor are touched and damaged.

An advantageous improvement of the apparatus according to the invention additionally comprises a plunger body that is movably held in the base body in the direction of the rail so that when required it can plunge into the rail and can establish a positive-locking connection with said rail in order to prevent movement of the base body across or along the rail. If the locking body is attached to the rail, this does not necessarily ensure prevention of movement of the apparatus according to the invention in the plane comprising the rail. By combining the plunger body with the locking body, locking of the apparatus according to the invention in all three spatial directions can be ensured.

An advantageous improvement of the apparatus according to the invention has an operating element that comprises, for example, a rotatable body with at least one cam, wherein by means of rotating the movement element the cam causes the locking body, the plunger body or both bodies to move. Particularly preferably the operating element comprises at least two cams, wherein one of the cams is used for moving the locking body, while a further cam is used for moving the plunger body. In this arrangement the cams should be designed in such a manner that for locking the locking body in the rail, and for inserting the plunger body into the rail, movement past a corresponding dead center of the cam takes place so that self-inhibition occurs and the connection to the rail does not become undone independently. This is of importance in particular in cases where the object is not located in a stationary, immobile space, but instead, for example, in a passenger cabin of an aircraft where it is regularly subjected to violent movements in various directions.

Particularly preferably, the operating element is arranged so as to be rotatable in the base body so that as compact as possible a design unit can be implemented which utilizes the existing design space as effectively as possible. There is no need to provide a positionally accurate bearing arrangement within the base body. It should merely be ensured that the operating element exerts adequate tension on the locking element for it to be pulled with adequate force to a limiting device on the rail so that a clamping effect occurs between the base body, the locking element and the rail. This could, for example, be implemented in that by means of connecting elements the locking element is mechanically connected to the operating element in such a manner that the locking element follows any movement of the operating element. If the locking element is within the rail underneath a limiting device of said rail, by slight lifting of the operating element said locking element could be pressed against the limiting device of the rail, for example projections or the like. For slight lifting, for example by means of one of the cams, the operating element in turn could push itself away from a face of the base body into a direction away from the rail. As a result of this the locking body is pulled against the limiting device of the rail underneath the base body in the direction of the base body. As a result of the counter force, the base body is pressed against the rail in the direction of the locking body. The apparatus according to the invention is thus clamped to the rail.

Furthermore, it is preferred if the base body comprises means for receiving the objects. These means can be of various types, for example holes, positive-locking or non-positive-locking connecting elements or the like. Optionally it would also be sensible to use compensating means for compensating the position of the object to be locked relative to the apparatus according to the invention. For example double wedge arrangements or similar would be imaginable.

It should be pointed out that features and side effects of the present invention have been described with reference to various embodiments of the invention. Further characteristics, advantages and application options of the present invention are stated in the following description of the exemplary embodiment and of the figures. In this arrangement all the described and/or illustrated characteristics per se and in any combination form the subject of the invention, even irrespective of their composition in the individual claims or their interrelationships.

BRIEF DESCRIPTION OF THE DRAWINGS

The present invention will hereinafter be described in conjunction with the following drawing figures, wherein like numerals denote like elements, and.

DETAILED DESCRIPTION

Figure 1A:
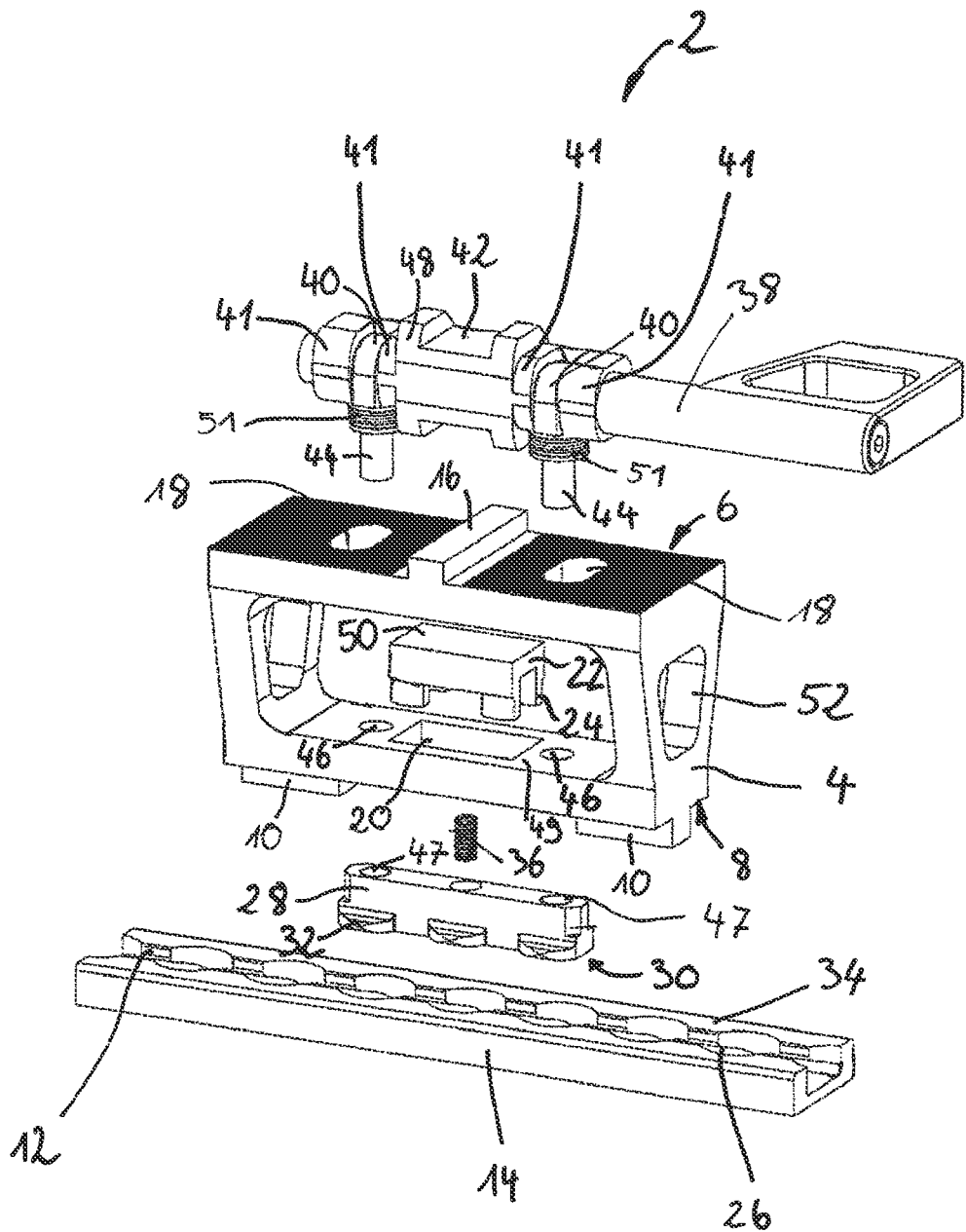
FIG. 1a shows an exploded view of the apparatus according to and embodiment of the invention.

FIG. 1a shows an exploded view of apparatus 2 according to the invention. The base body 4 comprising a top 6 and a bottom 8 is to be considered as the principal element of the apparatus 2 according to the invention. The bottom 8 comprises an essentially plane surface, which in the illustration shown comprises two projections 10 that can engage a slit 12 of a seat rail 14 so that the base body 4 can slide in a guided manner on the seat rail 14.

The top 6 of the base body 4 serves to receive an object (not shown in FIG. 1) which by means of the item of apparatus 2 according to the invention is to be affixed to the seat rail 14. For example, the top 6 of the base body 4 comprises a projection 16 that can be used for precise alignment of the object to the item of apparatus 2 according to the invention. Furthermore, in the exemplary embodiment shown, the surface 6 of the base body 4 comprises two elongated holes 18, in which, for example, in each case a threaded bush can be guided, which threaded bushes make it possible to affix by screw-type means an object that has been aligned by means of the projection 16.

At the bottom 8 of the base body 4 there is an aperture 20 in which a plunger body 22 can slide in a guided manner towards the seat rail 14 or away from the seat rail 14. The plunger body 22 has been formed in such a manner that it corresponds to the seat rail 14, that by means of projections 24 it can engage circular apertures 26 in the seat rail 14, which circular apertures 26 have been formed at regular spacing, for example spaced apart by one inch, along the entire elongation of the seat rail 14. If the plunger body 22 engages the seat rail 14 in such a manner, by means of the positive-locking connection it is possible to prevent the base body 4 from moving across or along the seat rail 14.

The apparatus 2 according to the invention further comprises a locking body 28, which in this example is designed as an elongated body that at its bottom 30 comprises several projections 32 which can plunge into the apertures 26 of the seat rail 14. Between the apertures 26 of the seat rail 14 there are projections 34 that represent the transition between the circular apertures 26 and the central slit 12. Underneath these apertures 26 the projections 32 of the locking body 28 can be positioned and can be pressed, by means of a corresponding tensile force acting from above the seat rail 14, from below against the projections 34 of the seat rail 14, and consequently the apparatus 2 according to the invention is firmly clamped to the seat rail 14. If undoing and displacing the base body 4 and the associated object along the seat rail 14 is necessary, the locking body 28 can be unlocked from its locking position underneath the projections 34 of the seat rail 14 so that the projections 32 of the locking body 28 move away from the projections 34 of the seat rail 14 in the direction of the interior of the seat rail 14 where they can slide freely. Correspondingly, the base body 4 can be displaced in the direction of elongation of the seat rail 14. There is no need for a lifting movement or the like of an object connected to the base body 4, or of the base body 4, from the slit 12 or from the apertures 26 of the seat rail 14, so that any re-positioning is very simple to bring about.

A spring 36 that is arranged between the locking body 28 and the plunger body 22 permanently exerts a counter force on the plunger body 22, as a result of which counter force independent detachment from the apertures 26 of the seat rail 14 can be ensured, provided no compressive force acts on the plunger body 22.

On an operating element 38, which is designed as an elongated body, in the exemplary embodiment shown two bearing means 40, for example eyes, are each enclosed by an outer and an inner cam 41 and are rotatably held on the operating element. Between the respective inner cams 41 an additional central cam 42 is arranged. In each case connecting elements 44 can connect the bearing means 40 to the locking body 28 in that said connecting elements 44 project through corresponding apertures 46 of the base body 4 in the direction of the seat rail 14 and can in each case be screwed into a respective aperture 47 in the locking body 28.

At each of its two sides the central cam 42 comprises a cam-shaped surface 48, which surfaces 48 can rest against the top 50 of the plunger body 22, thus serving to deflect the plunger body 22 in the direction of the seat rail 14. If the operating element 38 is rotated on its axis of elongation, due to their eccentric design the cam-shaped surfaces 48 extend relative to the axis of elongation of the operating element 38, more or less from the axis of elongation in the direction of the seat rail 14, so that depending on the position of the operating element 38 the plunger body 22 is deflected more or less towards the seat rail 14. If the base body 4 rests against the seat rail 14, accordingly by rotation of the operating element 38 to a locking position, securing the base body 4 in transverse direction and longitudinal direction can be achieved by way of the plunger body 22 plunged into the seat rail 14.

The inner and outer excentrics 41, which are arranged around the bearing means 40, are arranged on the operating element 38 in such a manner that with an also respective cam-shaped surface they act on plate springs 51 that are arranged on the connecting elements 44 and in the installed state of the apparatus 2 according to the invention rest against a region of the base body 4 around the holes 46. Rotating the operating element 38 on its axis of elongation of the operating element 38 results in the cam-shaped surface of the excentrics 41 extending to a greater or lesser extent from the axis of elongation in the direction of the seat rail 14 so that the plate springs 51 are to a greater or lesser extent pressed against the region around the holes 46.

As a result of the influence of the excentrics 41 on the plate springs 51 and of the influence of the central excentric 42 on the plunger body 22, the operating element 38 in the base body 4 is pushed away from the seat rail 14, and accordingly a tensile force acts on the locking element 28 that is connected to the operating element 38. If the tensile force is adequate, and if the projections 32 of the locking element 28 are arranged underneath the projections 34 of the seat rail 14, a clamping effect between the locking element 28, the seat rail 14 and the base body 4 can be produced. In this arrangement the tensile force acting on the locking element 28 depends on the respective design, in particular the eccentricity of the excentrics 41 and 42, so that a clamping force that is required for the object to be affixed can be set by a corresponding design of the cams. It should be ensured that before they reach a corresponding locking position, the excentrics 41, 42 move beyond a dead-center of motion so that self-inhibition occurs and as a result of the tensile force acting on the locking body 28 no independent moving-out of the locking position takes place.

For the sake of completeness it should be pointed out that the plate springs 51 represent an optional improvement of the apparatus 2 according to the invention, which are particularly well suited to exert a harmonic and defined force on the base body 4 and on the locking element 28 while permitting adequate elasticity for undoing the apparatus 2 according to the invention.

Figure 1B:
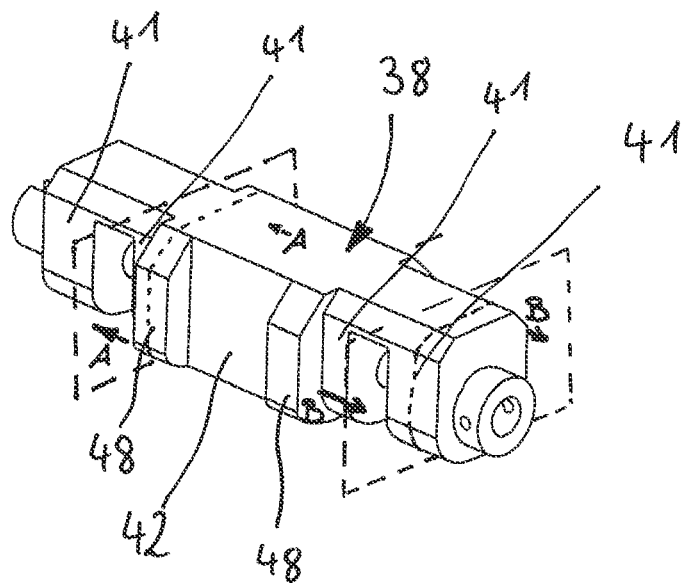
FIG. 1b shows a detailed view of the operating element.
Figure 1B:
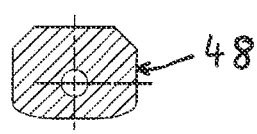
Figure 1B:
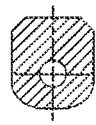

FIG. 1*b* shows the operating element 38 in more detail, but for the sake of simplicity without the handle piece and without bearing means 40. The sections of the excentrics 41 (section A-A) and of a cam-shaped surface 48 of the excentric 42 (section B-B) show the geometric designs of the excentrics 41 and 42 in somewhat more detail, in particular the eccentricity to an axis of elongation of the operating element 38. In FIG. 1*b* the operating element is arranged in a neutral position in which the locking element 28 would not be pressed against the seat rail 14 if it were located underneath the operating element 38.

At their sides facing the seat rail 14 the excentrics 41 and the cam-shaped surfaces 48 of the excentric 42 comprise rounded corners so that it is easier for the apparatus 2 according to the invention to reach a locking position. At the corners pointing away from the seat rails 14 the excentrics 41 or the cam-shaped surfaces 48 can be designed in such a manner that rotating the operating element 38 beyond a locking position or beyond a neutral position to an opposite direction is not possible as a result of end stops or other mechanical characteristics.

Figure 2:
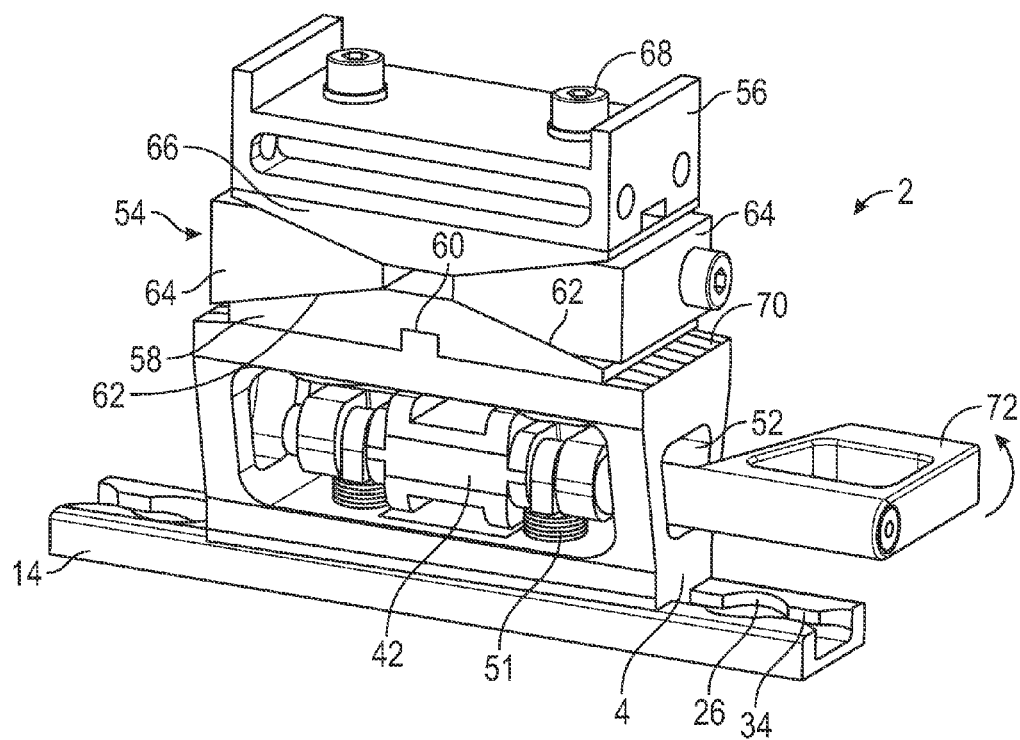
FIG. 2 shows an assembled apparatus according to an embodiment of the invention.

In its installed state the operating element 38 is located within the base body 4 and protrudes through an aperture 52 at a lateral surface of the base body 4 and out of said base body 4, as shown in FIG. 2. If the apparatus 2 according to the invention is not in a locking position, the operating element is arranged loosely and movably within the base body 4.

In FIG. 2 a double wedge arrangement 54 is arranged on the base body 4, which double wedge arrangement 54 carries the object 56 to be affixed. In this selected illustration the object 56 is merely shown as a possible coupling element or the like, because the apparatus 2 according to the invention is far smaller than the object 56 to be affixed, and therefore such a simplified view suggests itself.

The projections 10 of the base body 4 are situated in the slit 12 of the seat rail 14. The bottom 8 of the base body 4 is flush against the seat rail 14. If the apparatus 2 according to the invention is not in a locking position, i.e. if the locking body 28 does not exert a clamping effect on the projections 34 of the seat rail 14, the base body 4 can be freely displaced and positioned along the direction of elongation of the seat rail 14.

However, in the presentation of FIG. 2 the central excenter 42 of the operating element 38 is deflected in such a manner that the plunger body 22 is pushed towards the seat rail 14 and with its projections 24 correspondingly plunges into the circular apertures 26 of the seat rail. Likewise, the cams 41 press onto the base body 4 by way of the plate springs 51, and consequently a tensile force is triggered, by way of the connecting elements 44, between the locking body 28 and the operating element 38. When the locking element 28 is correspondingly positioned within the seat rail 14, the projections 32 of the locking element 28 are consequently pressed against the projections 34 of the seat rail 14. Between the base body 4, the locking element 28 and the seat rail 14 a clamping effect exists, by means of which the device according to the invention is locked to the seat rail 14, and the object 56 affixed to the base body is consequently affixed to the seat rail 14.

The double wedge arrangement 54, which as an example is arranged on the apparatus 2 according to the invention, essentially comprises a flange body 58 that comprises a recess 60 and two beveled areas 62. On these beveled areas 62 two wedges 64 are arranged which by mutual displacement and an optional screw-type arresting device predetermine the height of a terminating body 66 above the top 6 of the base body 4. In turn, the object 56 is arranged on the terminating body 66, which object 56 is screwed into threaded bushes by means of screws 68, with said threaded bushes being guided in the elongated holes 18.

Instead of the projection 16 and the recess 60 in the flange body, or in addition to the aforesaid, the top 6 of the base body 4 could comprise a tooth arrangement 70 that corresponds to a toothed surface of a bottom of the flange body 58. The tooth arrangement 70 could, for example, extend parallel to the seat rail 14. In this way a positive-locking connection between the two bodies, which connection acts across the seat rail 14, can be ensured, wherein said connection can be supported by additional clamping as a result of the screws 68.

The operating element 38 comprises, for example, a lever 72 which can preferably be operated without the need for tools, i.e. purely by the manual operation of an operator. By moving the lever to the horizontal position shown, a clamping effect and thus locking the object 56 to the seat rail 14 can be achieved. When the lever 72 is moved back to a vertical position, the locking effect is cancelled, and the object 56 can be displaced along the direction of elongation of the seat rail 14.

Figure 3:
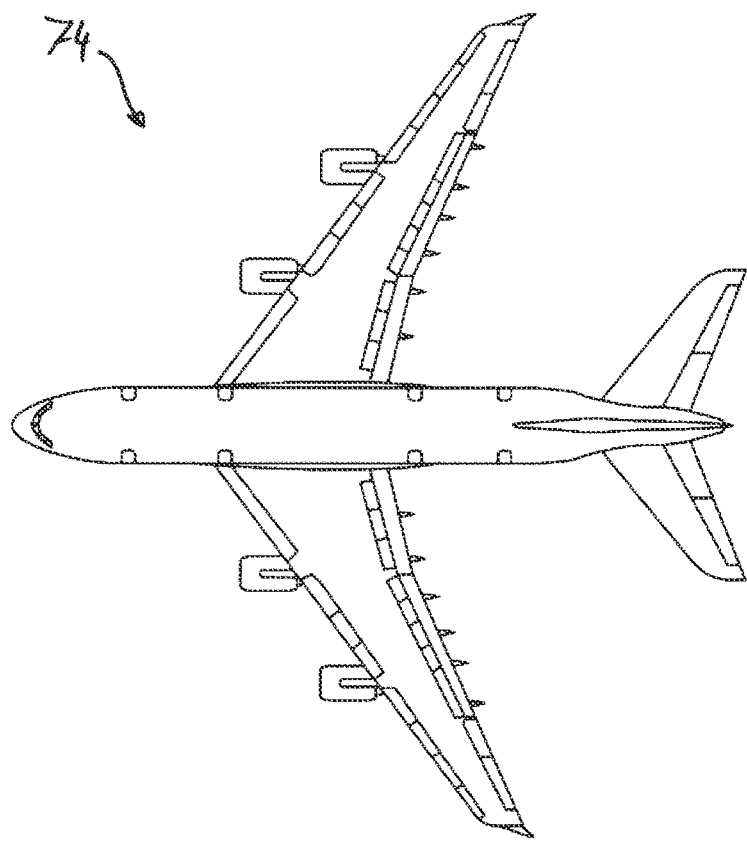
FIG. 3 shows an aircraft comprising a cabin and at least one apparatus according to an embodiment of the invention.

FIG. 3 shows a typical modern commercial aircraft 74 that comprises one or several passenger cabins in which usually seat rails 14 are arranged, to which seat rails 14 objects are locked. The use of the apparatus 2 according to the invention for affixing an object to a rail can represent an improvement in that, if desired, reconfiguration of the complete cabin could be achieved as quickly as possible, in other words between two subsequent flights.

In addition, it should be pointed out that "comprising" does not exclude other elements or steps, and "a" or "one" does not exclude a plural number. Reference characters in the claims are not to be interpreted as limitations.

It should be pointed out those characteristics which have been described with reference to one of the above exemplary embodiments or to a design can also be used in combination with other characteristics of other exemplary embodiments described above.

What is claimed is:

1. An apparatus for affixing an object to a rail, comprising:
a base body having a bottom, the bottom of the base body including a plane surface having at least one projection, the plane surface resting on the rail and the at least one projection extending into the rail;
a locking body movable relative to the base body, the locking body having a longitudinal extension and a plurality of projections spaced apart along the longitudinal extension that engage the rail;
a plunger body movably held relative to the base body;
a spring arranged between the locking body and the plunger body to exert a counterforce on the plunger body to permit disengagement of the plunger body from the rail;
an operating element rotatable in the base body and comprising a cam that acts on the base body and when rotated moves the locking body towards the base body; and
a bearing connecting the operating element and the locking body,
wherein the plunger body includes a plurality of projections that engage the rail.

2. The apparatus of claim 1, wherein the operating element comprises a second cam configured to deflect the plunger body and act on a surface of the plunger body.

3. The apparatus of claim 1, wherein the at least one projection is configured to guide a sliding in a slit of the rail.

4. The apparatus of claim 1, further comprising a connecting element arranged between the bearing and the locking body and configured to reduce a mechanical rigidity and comprises a plate spring.

5. The apparatus of claim 1, wherein the base body comprises a second projection configured to receive a recess of a flange body.

6. The apparatus of claim 1, further comprising a wedge arrangement arranged on the base body and configured for a variable-height receiving of the object.

7. The apparatus of claim 1, wherein a surface of the base body comprises a tooth arrangement.

* * * * *